US012628744B2

(12) United States Patent
Fiorello et al.

(10) Patent No.: US 12,628,744 B2
(45) Date of Patent: May 19, 2026

(54) DEVICE WITH SOLUBLE HOOK-SHAPED MICRO-ELEMENTS FOR THE DEPLOYMENT OF SUBSTANCES INTO THE LEAVES OF PLANTS

(71) Applicant: Fondazione Istituto Italiano di Tecnologia, Genoa (IT)

(72) Inventors: Isabella Fiorello, Genoa (IT); Fabian Meder, Genoa (IT); Alessio Mondini, Genoa (IT); Barbara Mazzolai, Genoa (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 0 days.

(21) Appl. No.: 18/697,697

(22) PCT Filed: Sep. 30, 2022

(86) PCT No.: PCT/IB2022/059331
§ 371 (c)(1),
(2) Date: Apr. 1, 2024

(87) PCT Pub. No.: WO2023/053078
PCT Pub. Date: Apr. 6, 2023

(65) Prior Publication Data
US 2025/0228166 A1      Jul. 17, 2025

(30) Foreign Application Priority Data
Sep. 30, 2021    (IT) ........................ 102021000025100

(51) Int. Cl.
*A01G 7/06* (2006.01)

(52) U.S. Cl.
CPC ..................................... *A01G 7/06* (2013.01)

(58) Field of Classification Search
CPC ........................................................ A01G 7/06
(Continued)

(56) References Cited

U.S. PATENT DOCUMENTS 2,261,368 A * 11/1941 Hecht ...................... A01G 7/06
435/911
2,309,391 A * 1/1943 Hecht ...................... A01G 7/06
47/57.5
(Continued)

FOREIGN PATENT DOCUMENTS

| CA | 2189612 | 3/1996 |
| WO | 2015048777 | 4/2015 |

(Continued)

OTHER PUBLICATIONS

International Search Report Dated Jan. 27, 2023.
(Continued)

*Primary Examiner* — Timothy D Collins
*Assistant Examiner* — Maria E Graber
(74) *Attorney, Agent, or Firm* — Preston Smirman; SMIRMAN IP LAW, PLLC

(57) ABSTRACT
The invention concerns a miniaturised device (10) suitable for deploying substances into the leaves (F) of plants comprising an array of anchoring micro-elements (12) made of a soluble material. The device also comprises sensors (23), so that it is possible to simultaneously deploy substances on both the abaxial and the adaxial side of the leaf (F) and simultaneously monitor the effects thereof.

10 Claims, 8 Drawing Sheets

(58) Field of Classification Search
USPC ........................................................ 47/57.5
See application file for complete search history.

(56) References Cited

U.S. PATENT DOCUMENTS

| 3,943,932 | A | * | 3/1976 | Woo | A61N 1/0551 |
| | | | | | 606/189 |
| 4,126,962 | A | * | 11/1978 | Polcaro | A47L 25/00 |
| | | | | | 15/210.1 |
| 6,334,856 | B1 | * | 1/2002 | Allen | A61B 5/150022 |
| | | | | | 216/75 |
| 6,611,707 | B1 | * | 8/2003 | Prausnitz | A61M 37/0015 |
| | | | | | 604/21 |
| 10,265,511 | B2 | * | 4/2019 | McAllister | A61M 37/0015 |
| 11,606,948 | B2 | * | 3/2023 | Rad | A01M 21/043 |
| 12,246,359 | B2 | * | 3/2025 | Collins | B08B 3/08 |
| 2008/0312635 | A1 | * | 12/2008 | Rad | A61D 7/00 |
| | | | | | 604/506 |
| 2012/0017500 | A1 | * | 1/2012 | Davis | A01G 7/06 |
| | | | | | 47/1.5 |
| 2016/0374939 | A1 | * | 12/2016 | Shastry | A61K 9/0021 |
| | | | | | 264/496 |
| 2017/0209553 | A1 | * | 7/2017 | Kaspar | A61P 25/14 |
| 2017/0296465 | A1 | * | 10/2017 | Yoshida | A61K 38/27 |
| 2018/0125055 | A1 | * | 5/2018 | Petersen | A01M 7/0046 |
| 2021/0178138 | A1 | * | 6/2021 | Gao | A61K 47/38 |
| 2023/0226334 | A1 | * | 7/2023 | McAllister | A61M 37/0015 |
| | | | | | 604/173 |

FOREIGN PATENT DOCUMENTS

| WO | 2019195350 | 10/2019 |
| WO | 2020005973 | 1/2020 |
| WO | 2020232394 | 11/2020 |
| WO | 2021146554 | 7/2021 |

OTHER PUBLICATIONS

Written Opinion of the International Searching Authority Dated Jan. 27, 2023.

International Preliminary Report On Patentability Dated Apr. 2, 2024.

Park. J.-H. et al., :Polymer Microneedles for Controlled-Rlease Drug Delivery, Pharmaceutical Research, Kluwer Academic Publishers-Plenum Publishers, NL., vol. 23, No. 5, May 4, 2006, pp. 1008-1019.

Cao, Y. et al., "Precision Delivery of Multiscale Payloads To Tissue-Specific Targets in Plants," Advanced Science, vol. 7, 1903551, 2020.

Fiorello, I. et al., "Micropatterned Devices: Climbing Plant-Inspired Micropatterned Devices for Reversible Attachment," Advanced Functional Materials, vol. 30, 2070256, 2020.

* cited by examiner

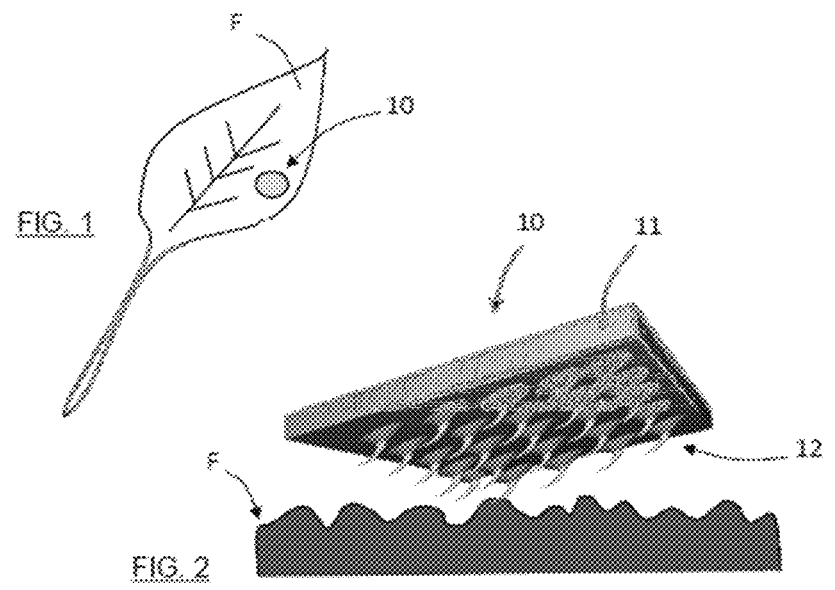
FIG. 1
FIG. 2
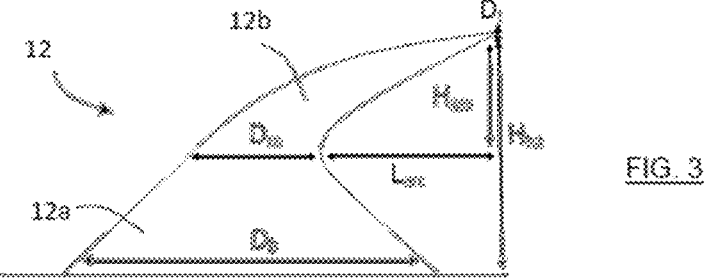
FIG. 3
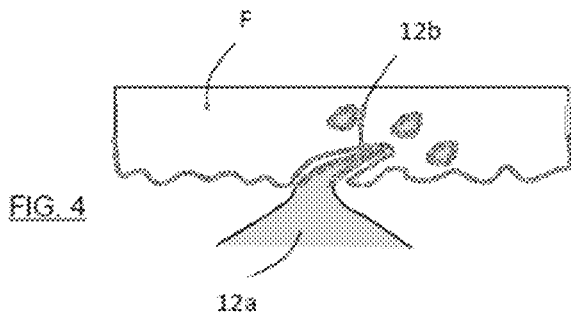
FIG. 4

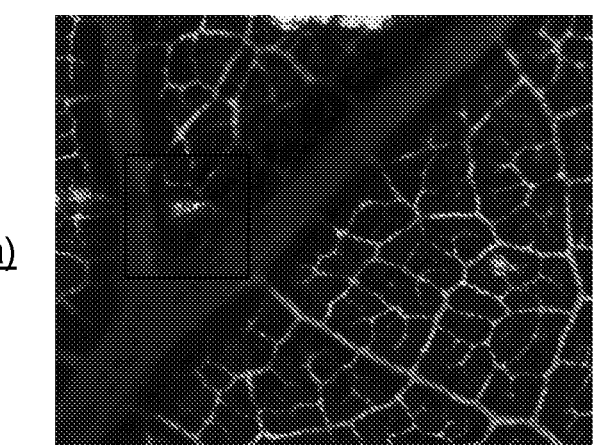
a)
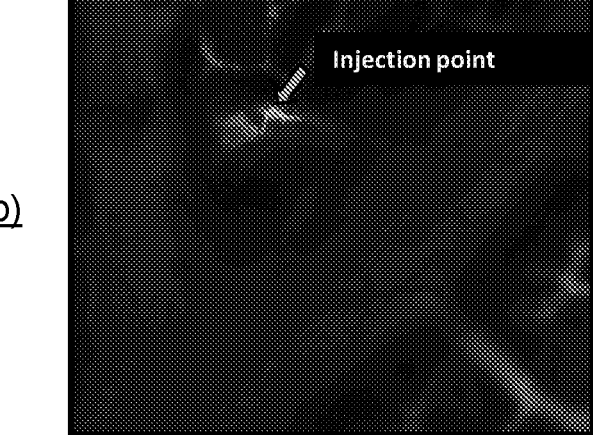
b)
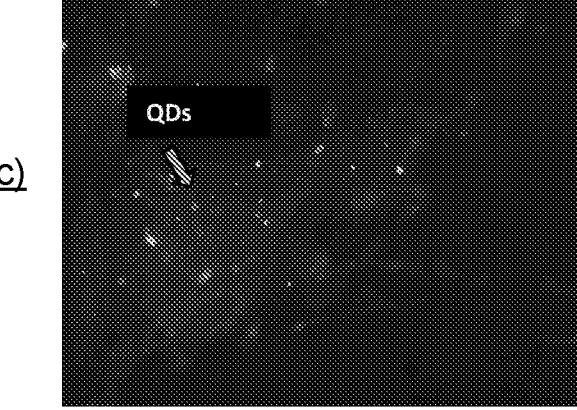
c)
FIG. 13

DEVICE WITH SOLUBLE HOOK-SHAPED MICRO-ELEMENTS FOR THE DEPLOYMENT OF SUBSTANCES INTO THE LEAVES OF PLANTS

CROSS-REFERENCE TO RELATED APPLICATION

The instant application is a national phase of PCT International Application No. PCT/IB2022/059331 filed Sep. 30, 2022, and claims priority to Italian Patent Application Ser. No. 102021000025100 filed Sep. 30, 2021, the entire specifications of both of which are expressly incorporated herein by reference.

TECHNICAL SECTOR

The present invention fits into the field of agricultural sciences.

More specifically, the invention is within the scope of devices suitable for deploying into the plants, and in particular into leaves, nutritive or curative substances, pesticides or other substances containing active ingredients mainly in the form of nanoparticles, molecules, salts, ions, nucleic acids, proteins, viruses, or bacteria.

BACKGROUND ART

Plants play a key role in the health of the ecosystem and are our main food supply which therefore needs attentive care to protect our planet and to provide the growing population with food. For this reason, sustainable and intelligent technologies for precision agriculture and plant bioengineering that can help preserve natural resources to optimise the consumption of water and pesticides and improve crop productivity are constantly being studied. In this scenario, there is a growing interest in the use of soluble/biodegradable miniaturised devices capable of acting directly close to the plant organs for in situ applications, be they for substance deployment as well as for the detection of the conditions of the plant health and/or of modification/stimulation for the production of specific molecules or genetic transformation of the plant itself.

Conventionally, the most commonly used methods for deploying substances to the plants are foliar spray, absorption through the roots, and injection in the trunk or petiole feeding. Although foliar spray and absorption through the roots are easy to implement, they have the major disadvantage of significant material loss and low efficiency due to the plant's barrier tissues such as the cuticle and the epidermis.

Injection into the trunk and feeding from the petiole overcome the problems caused by the plant's barrier tissues mechanically damaging these barriers and directly accessing the vascular system. They have a greater delivery efficiency and can be used to provide large amounts of active ingredients. However, they are suitable for large and woody plants due to their invasive application method. In addition, valuable and labile active ingredients are not suitable for distribution by these methods.

The leaves represent the most common organs of plants and the most extensive biointerface in the world. However, application technologies (both for substance detection and for the detection of conditions) directly on the leaves are limited due to the fragile and heterogeneous structure thereof (e.g., presence of different microstructures on the foliar surface, hardness, and roughness).

For example, techniques of foliar infiltration and infusion in a pressurised bath are known and are widely used in the laboratory to administer active ingredients directly to the leaves. However, these also have a low delivery efficiency as most of the materials are deployed into the intercellular space of the leaves.

Cao, Y., Lim, E., Xu, M., Weng, J. K. & Marelli, B. "Precision Delivery of Multiscale Payloads to Tissue-Specific Targets in Plants." *Advanced Science,* 1903551 (2020), describes a miniaturised device consisting of a biodegradable micro-needle matrix that can attach to the surface of the leaf by penetrating the surface barrier deploying into the plant's vascular system a variety of active ingredients that can range from small molecules to large proteins. The transport material of which the micro-needles are made is a soluble material based on silk fibroin. The use of this material has significant disadvantages that prevent the diffusion and use of the promising active ingredient deployment technology directly in the vascular tissue of the leaves. First of all, silk fibroin is a very rare and expensive material derived from silkworm as it requires long and complex extraction methods. Silk fibroin is a poorly soluble material in contact with the sap of the plant and in order to be able to be dissolved in the sap of the plant it needs to be engineered, which is a long and expensive method. Further, the realisation of soluble components in such material is performed by vacuum infiltration which is also a long and expensive method. In addition, the mechanical characteristics of the micro-needles, due both to the material of which they are made and to their geometry, as well as the times of dissolution of the material, do not allow the creation of devices that are able to deploy the active ingredients within optimal times, or in any case adaptable according to the needs without a great expense of costs.

Regarding the geometry of the micro-needles, in Fiorello, I. et al. "Micropatterned Devices: Climbing Plant-Inspired Micropatterned Devices for Reversible Attachment" (Adv. Funct. Mater. 38/2020). *Advanced Functional Materials* 30, 2070256 (2020), a bio-inspired abaxial hook-shaped micro-element geometry is described which shows high values of tensile and shear forces on different rough surfaces as well as an easy anchoring reversibility. The abaxial hook-shaped micro-elements described therein therefore allow, with respect to the micro-needles, a greater positioning stability on the foliar surface and, thanks to reversibility, they open the field to applications that are even different from the deployment of active ingredients alone. However, modifying the geometry of the micro-needles does not, by itself, allow to optimise the deployment times of the active ingredients, hence the efficiency of use of the active ingredients themselves.

SUMMARY OF THE INVENTION

An object of the present invention is to propose a device with soluble micro-needles for applications to plant leaves, both for the purpose of deploying active ingredients and for detection, which has very low realisation costs compared to the prior art.

Another object of the present invention is to propose a device with soluble micro-needles for deploying active ingredients into the leaves of the plants that allows to deploy the active ingredients in a particularly efficient way, in particular in relation to the possibility of remaining on the leaf and deploying active ingredients directly into the vascular tissue of the latter with optimised deployment times and easily adjustable according to the needs.

A further object of the present invention is to propose a method for the production of a device with soluble micro-needles for applications on leaves of plants which allows to produce said device in a simple and cost-effective way.

Conventionally, a miniaturised device suitable for deploying substances into the inner tissue of leaves of the plants comprises one or more anchoring micro-elements made of a soluble material, so that the anchoring micro-element penetrates the inner tissue of the leaf and by dissolving it deploys the active ingredients contained therein.

According to a characteristic aspect of the present invention a miniaturised device as outlined above is an integrated device which also includes electronic components comprising sensors for monitoring the effect of the substances deployed on the plant.

Advantageously, the anchoring micro-elements are made of a material based on sugar alcohols, advantageously selected from isomalt, erythritol, lactitol, maltitol, mannitol, xylitol and sorbitol or a mixture thereof.

Among the aforementioned materials, isomalt in particular has optimal characteristics as it has enormously lower costs than silk fibroin (about 15,000 times lower), is able to dissolve quite quickly within the foliar tissue, has no environmental impact as it is completely biodegradable.

Still advantageously, said one or more anchoring micro-elements are a matrix of abaxial hook-shaped micro-elements each having dimensions of the order of tens or hundreds of μm, arranged in arrays.

Abaxial hook-shaped micro-elements have much higher tensile strength characteristics than micro-needles, therefore, together with the chosen material which has the ability to dissolve in a relatively short time, they allow the device to deploy all their active ingredient load into the tissue of the plant without the device risking a premature detachment from the foliar surface. In addition, the abaxial hook-shaped micro-element geometry produces contact separation forces dependent on the application direction so it is possible to envisage applications in which it is appropriate that the device can also be easily detached from the foliar surface.

BRIEF DESCRIPTION OF THE DRAWINGS

These and other aspects and advantages of the invention will become more comprehensible from the following description of an embodiment of the same, provided by way of example only, with the aid of the accompanying drawings, wherein:

FIG. 1 frontally shows a leaf of a plant on which a miniaturised device according to the present invention is applied;

FIG. 2 shows a perspective view of a device according to the present invention in a step of application to the surface of the leaf;

FIG. 3 shows a sectional view of an anchoring element of a device according to the present invention;

FIG. 4 schematically shows the anchoring element of FIG. 3 applied to a leaf;

FIG. 7 shows a photo of a leaf on which a device according to the present invention is applied; FIG. 8 shows microscopic images of a single hook applied to the surface of a leaf; FIG. 9 shows microscopic images of areas of a leaf in which the fluorescence fluid has been deployed; FIG. 10 shows the fluorescence image of an area of a leaf after the removal of the device of the invention; FIG. 11 shows in Cartesian diagrams the variation of the fluorescence intensity in the vascular tissue of the leaf; FIG. 12 shows in the Cartesian diagram the variation over time of the area of a dissolving hook-shaped micro-element;

FIG. 13 shows the microscopic surface of the leaf where the deployment of nanoparticles, such as quantum dots (QDs), within the vascular tissue of the leaf by means of a device according to the present invention is highlighted;

DETAILED DESCRIPTION OF PREFERRED EMBODIMENTS

Figure 5:
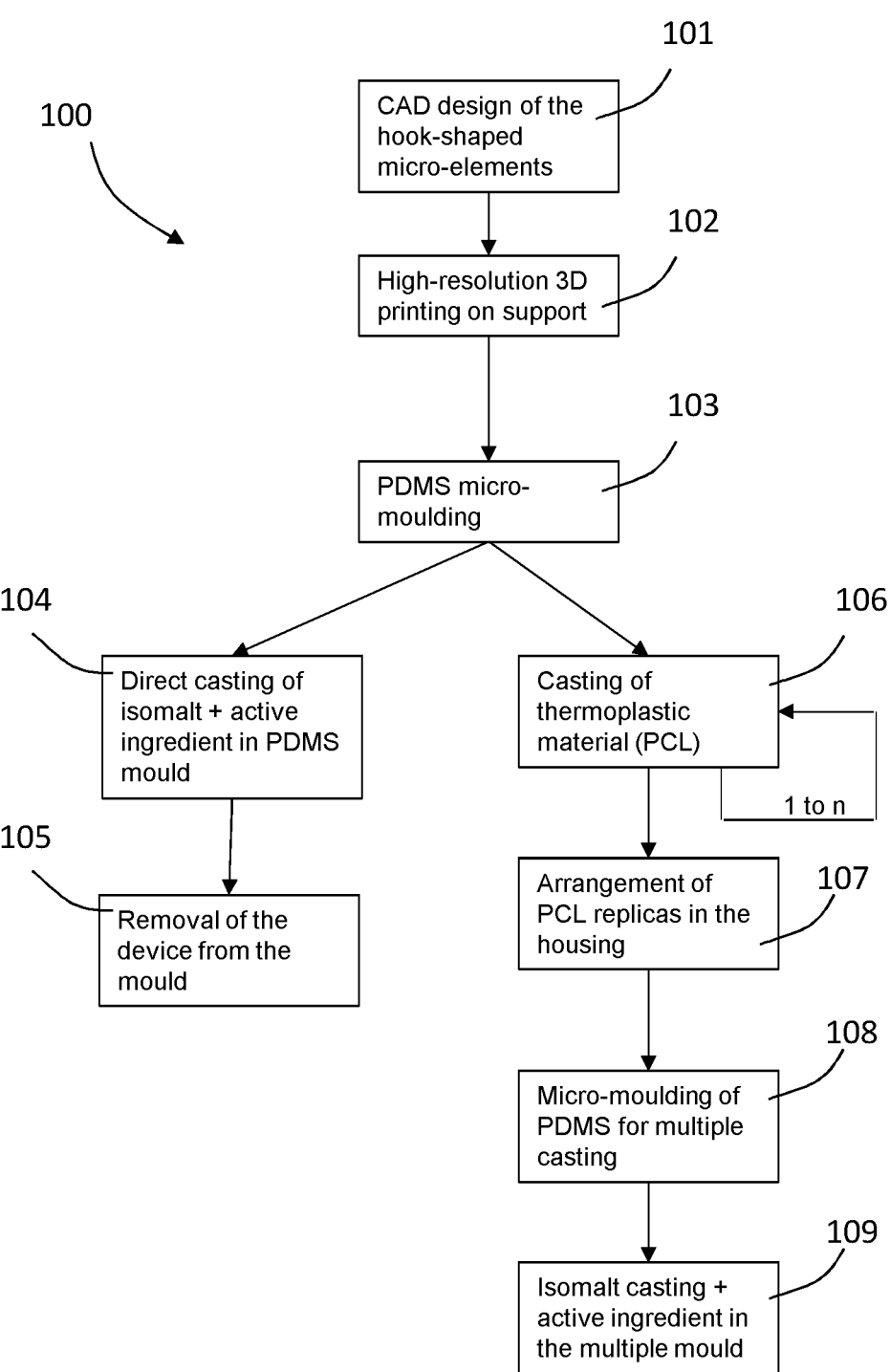
FIG. 5 shows a flowchart of the main steps of a method according to the present invention for realising soluble miniaturised devices suitable for deploying substances into the inner tissue of leaves of the plants.

With reference to FIGS. 1 and 2, a miniaturised soluble device suitable for deploying substances into the inner tissue of leaves, F, of plants is generally indicated with numeral 10. The device 10 consists of a sheet support, 11, on one side of which arrays of anchoring micro-elements, 12 protrude.

As best seen in FIG. 3, each anchoring micro-element 12 consists of an abaxial hook-shaped micro-element. The term abaxial is used in botany to indicate a side or surface of an organ facing and positioned on the opposite side with respect to that facing its supporting axis. In a leaf the abaxial side is typically the lower side. The geometry of the hook-shaped micro-elements is inspired by the climbing mechanism of the plant G. aparine L. whose leaves on the adaxial side are provided with hook-shaped micro-elements similar to those Velcro is inspired by, while on the abaxial side they are provided with hook-shaped micro-elements having the peculiar shape shown in FIG. 3. An anchoring micro-element 12 consisting of an abaxial hook-shaped micro-element is formed by a conical base, 12a and by a hooked upper portion, 12b, which becomes thinner as it approaches the apical part. Compared to Velcro-type adaxial hook-shaped micro-elements, the hooked portion 12b of an abaxial hook-shaped micro-element never assumes a downward orientation, is squatter and has a prevalent extension in the direction parallel to the orthogonal surface with respect to the extension in the direction orthogonal thereto. As seen in FIG. 3 the main geometric parameters of the abaxial hook-shaped micro-element 12 are the total height $H_{tot}$, the height of the hooked portion$_{arc}$, the horizontal length of the hooked portion measured from the inner side $L_{arc}$, the base diameter of the base $D_b$ and the base diameter of the hooked portion $D_m$. As can be seen again in FIG. 3, $H_{tot}$ is about twice as $H_{arc}$, $D_b$ is between two and three times $D_m$, $L_{arc}$ is between 1.5 and 2 times $H_{arc}$ and between 1 and 2 times $D_m$. In terms of absolute values, a hooking micro-element according to the present invention has $H_{tot}$ comprised in orders of magnitude comprised between tens and hundreds of μm, preferably between 100 μm and 600 μm. The aforementioned geometric characteristics, which as already mentioned are largely inspired by those of the abaxial hook-shaped micro-elements of the leaves of G. aparine L. The device 10 has a hook-shaped micro-element density between 10 hook-shaped micro-elements per$^2$ and 1,000 hook-shaped micro-elements per cm$^2$. Together with the choice of a material having suitable mechanical characteristics in particular with regard to the Young's module, the aforementioned geometric characteristics allow the device 10 to show very high contact separation forces and dependent on the application direction.

According to the present invention, the anchoring micro-elements 12 are made of a material based on sugar alcohols. More specifically, the anchoring micro-elements 12 are made of a material selected from isomalt, erythritol, lactitol, maltitol, mannitol, xylitol and sorbitol or a mixture thereof.

According to a preferred embodiment of the invention the anchoring micro-elements 12 and the relative sheet support 11 are made of isomalt. Isomalt is a material that has a very low cost, is not toxic, is soluble and recyclable. Particularly advantageous characteristics for the present application are the fact that the isomalt has a great mechanical resistance, which allows the manufacture of resistant hook-shaped micro-elements capable of anchoring and penetrating the leaves in the cutting direction and is also very soluble from the sap of the plants. The isomalt is advantageously mixed with substances containing active ingredients which are deployed into the inner tissues of the leaf when the isomalt solubilises. The aforementioned active ingredients can be molecules, nanoparticles, nucleic acids, salts, ions, viruses, bacteria or other, for example with nutritional, fertilising, pesticidal or other function.

The realisation of the device 10 in isomalt, or more generally in a material based on sugar alcohols, allows to greatly reduce the costs compared to the prior art while also improving the mechanical characteristics of the device.

With reference to FIG. 4, the use of isomalt in combination with the peculiar abaxial hook-shaped micro-element geometry of the anchoring micro-elements 12, allow to make particularly efficient the deployment of the active substances into the inner tissue of the leaf F avoiding their dispersion. In fact, the geometry of the hook-shaped micro-elements, whose size can be defined according to the surface structure of the leaves on which the device must be anchored, allows to obtain a maximum detachment force and a maximum shear anchoring force that are higher than those experienced with other geometries, for example micro-needles, so that the device can remain anchored to the leaf longer and even in the presence of greater stresses. At the same time, the high solubility of the isomalt from the sap of the plants makes the deployment of the active ingredients mixed with the isomalt quick. In this way, the risk that part of the active ingredient is not transferred to the inner tissue of the leaf due to premature detachment of the device from the leaf is greatly reduced.

Figures 7, 8:
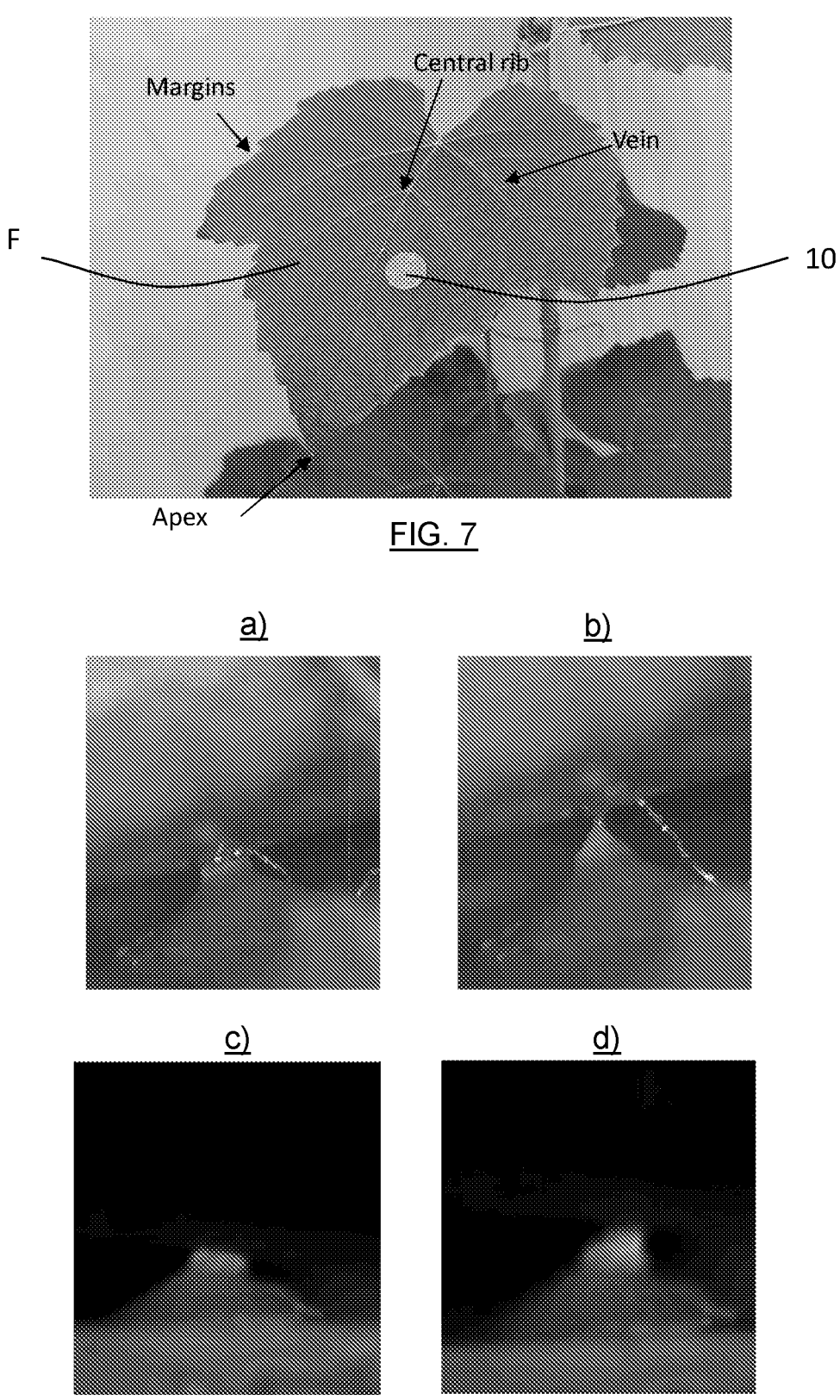
FIGS. 7 to 12 relate to the experimental documentation on the deployment of a fluorescent fluid into the vascular tissue of a leaf by means of a device according to the present invention.
Figure 9:
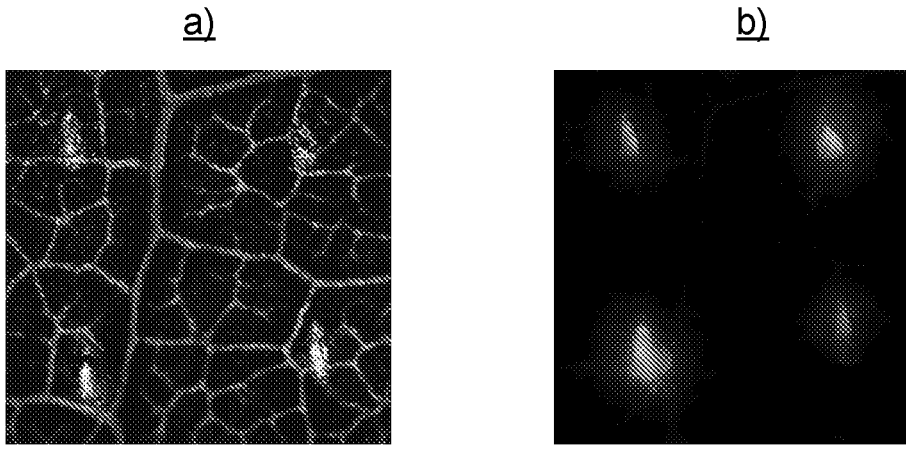
Figure 10:
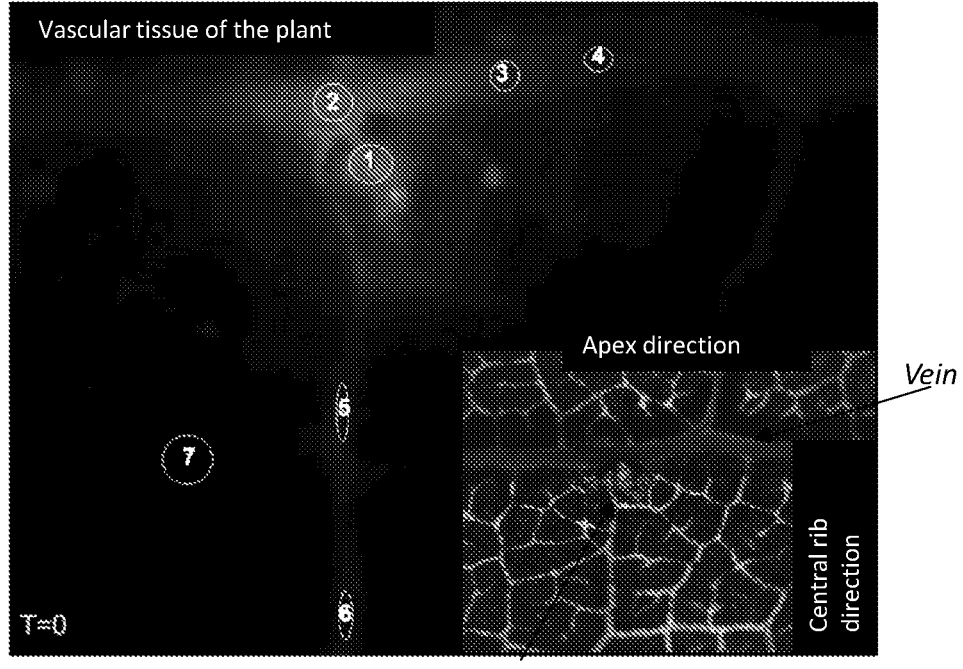
Figure 11:
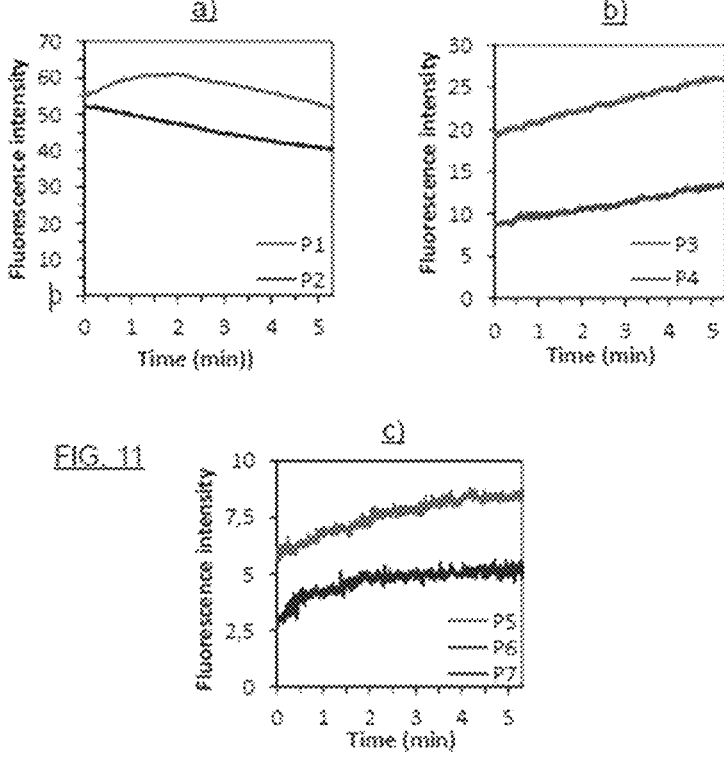
Figure 12:
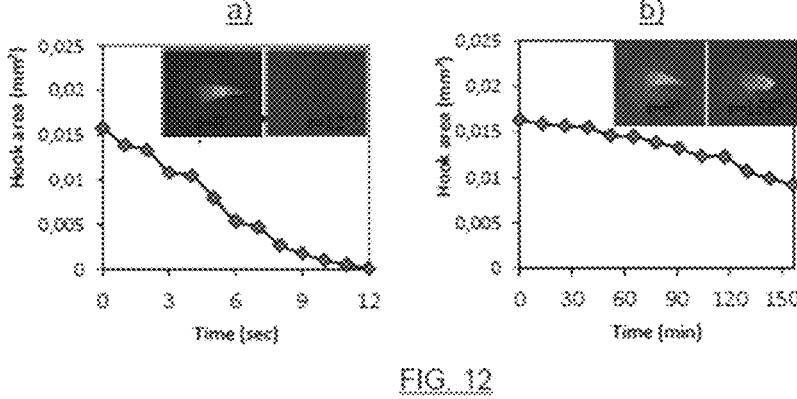

With reference to FIGS. 7 to 12, the advantages of a device 1 as outlined above have been experimentally verified by monitoring the deployment and the diffusion of a detector material (fluorescein) in a leaf of *Vitis lambrusca*. FIG. 7 shows the photo of a device 1 according to the present invention on the adaxial surface of a leaf F. The device 1 is made of isomalt to which fluorescein has been mixed. FIG. 8 shows images made under a microscope of the device 1 applied to the leaf 7 of FIG. 7. Photos a) and b) are digital images, photos c) and d) are photos obtained with fluorescence techniques. FIG. 9 shows images of areas of the leaf that have been injected through the hook-shaped micro-element arrays, obtained with light field microscopy technique, with red filter (photo a)) and in fluorescence (photo b)). FIG. 10 shows fluorescent images of the leaf veins after the device 1 has been removed. The device had been applied close to the central rib and the hook-shaped micro-elements penetrated a vein. The numbered circles and ellipses in the figure indicate the areas of the vascular tissues of the leaf that have been monitored. The box at the bottom right is a photo with light field microscopy showing the orientation of the deployment point with respect to the leaf F. FIG. 11 shows the temporal variation of the fluorescence intensity in the vascular tissue at the monitored points indicated in FIG. 10. FIG. 12 shows the temporal variation of the area of the hook-shaped micro-elements when they are placed in dissolution in water, a), or exposed to ambient humidity, b).

With reference to FIG. 13 the ability of a device 1 according to the invention to deploy Quantum dots (QDs) into the vascular tissue of the leaf has also been experimentally investigated. The images show with fluorescence microscopy techniques the injection point on the leaf, a), b) and the QDs deployed into the vascular tissue, c).

Turning now to the structural description of the device of the invention, an advantageous embodiment variant provides that the anchoring micro-element 12 is made of a material based on sugar alcohols, coated with a material with reduced solubility. The term "material with reduced solubility" herein refers to a material that is not soluble in the sap of the plants or that in any case has a lower solubility in the sap of the plants than that of sugar alcohols, said material with reduced solubility being also advantageously able to be chosen (for example by means of an appropriate choice of the relative pH) so as to appropriately schedule the time of dissolution of the coating of the hook-shaped micro-elements into the foliar tissue. The device thus retains the advantages of being made mainly with a material that has very low cost and optimal mechanical characteristics but the protective outer coating allows a much longer life of the hook-shaped micro-elements. In this case, a particularly advantageous embodiment provides that the anchoring micro-elements 12 have abaxial hook-shaped micro-element geometry. In fact, one of the most peculiar characteristics of this geometry is the fact that the shear anchoring force is dependent on the application direction so that while a very high shear anchoring force is exerted in one direction, the shear anchoring force is practically nil in the opposite direction, thus allowing an easy removability of the device. The aforementioned combination of characteristics therefore allows a device according to the invention to be particularly suitable for very different applications in which a long life of the anchoring micro-elements 12 and a reversibility of the anchoring, such as for example sensing applications, are necessary.

Since the individual anchoring micro-elements 12 already partially dissolve under ambient humidity, according to an advantageous embodiment variant a protective surface layer made of a material with reduced solubility is provided only at the conical base 12*a*.

Figures 14, 15, 16:
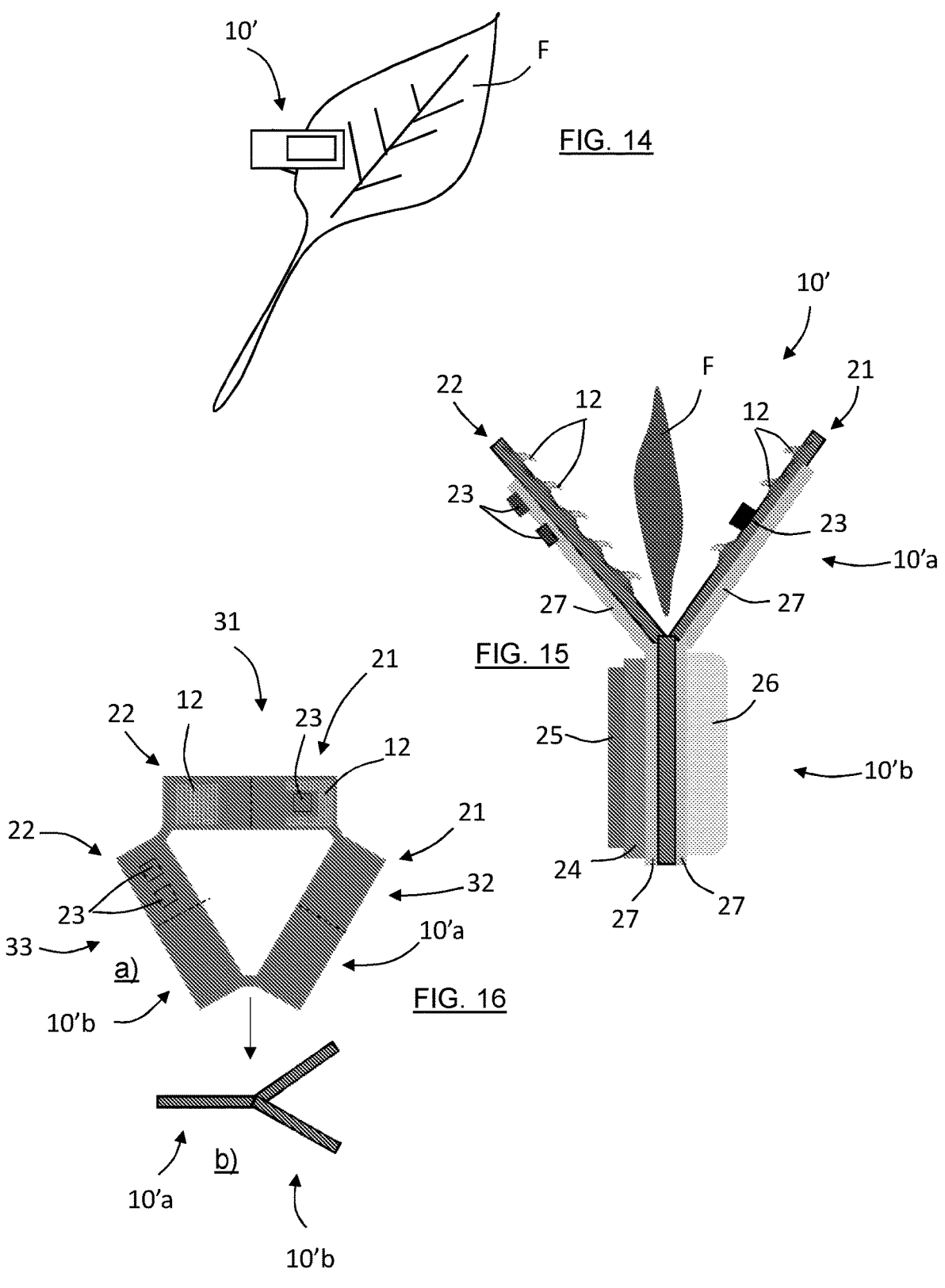
FIG. 14 shows a schematic representation of a leaf on which an embodiment variant of a device according to the present invention is applied.
FIG. 15 shows a schematic side view of a device of the present invention according to the embodiment variant of FIG. 14.
FIG. 16 schematically shows a construction mode of the device of FIG. 15.

With reference to FIGS. 14 to 16, a miniaturised device for deploying active substances into the leaves as described above is part of an integrated device, 10', according to the present invention which provides integrated functionality for both the deployment of substances by dissolution and for monitoring the leaf. The integrated device 10' can deploy substances on both the abaxial and the adaxial part of the leaf and at the same time monitor the effect of these substances on the plant thanks to the presence of electronic components comprising sensors, 23. The integrated device 10' comprises a distal portion, 10'*a*, and a proximal portion, 10'*b*, consisting of a pair of jaws, 21, 22, through which the proximal portion 10'*b* can be clamped to a leaf, F. The inner sides of both jaws 21 and 22 are provided with anchoring micro-elements 12 according to the present invention which, as previously described, allow the integrated device 10' to anchor stably to the leaf F and deploy substances both from the abaxial side and from the adaxial side thereof. The proximal portion 10'*b* comprises sensors, 23, (such as humidity sensors, temperature sensors, light sensors, or others) which may be provided on both the outer and inner side of the jaws 21, 22. The distal portion 10'*a* comprises electrical and electronic components that allow the acquisition, processing and remote sending of the data acquired by the sensors 23. For example, an electronic board, 24, containing management, processing and storage means, a communication module, 25, a battery, 26 and electronic circuitry, 27 for connecting the various components are advantageously present. Obviously, the arrangement of the components mentioned above is purely indicative and the number, type, and arrangement of the electronic components of the integrated device 10' can certainly be different still with a view of providing monitoring functionality.

As seen in FIG. 16, the integrated device 10' is advantageously realised with an origami design in which three supporting elements, 31, 32, 33 are obtained in a single sheet of rigid or flexible material, which are intended to be suitably superimposed so that a first supporting element, 31, forms the inner sides of the jaws 21 and 22, a second supporting element, 32, forms the outer side of the first jaw 21 and a first side of the distal portion 10'*a*, and a third supporting element, 33, forms the outer side of the second jaw 22 and the other side of the distal portion 10'*a*. Thanks to this embodiment, the arrays of anchoring micro-elements 12 and the electronic components for the monitoring functions can advantageously be integrated into the respective supporting elements 31, 32, 33 before the final assembly of the integrated device 1'. The integrated device 1' allows at the same time the deployment of substances and the simultaneous monitoring of the abaxial and adaxial part of the leaf.

Figure 6:
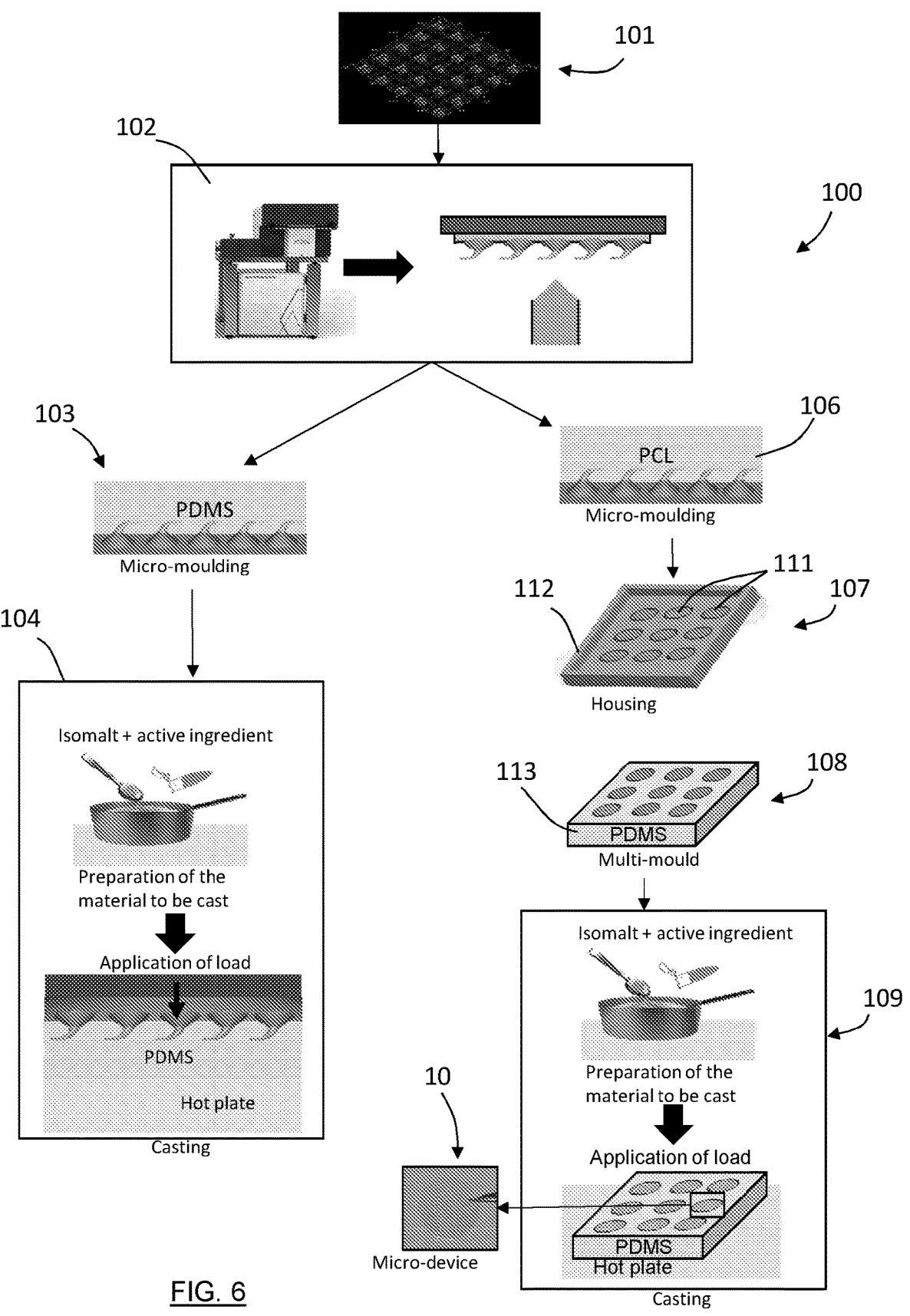
FIG. 6 shows an image representation of the flowchart of FIG. 5.

With reference to FIGS. 5 and 6 a miniaturised device 10 according to the present invention is advantageously produced by a peculiar and innovative production method, 100. The production method according to the invention provides for the combination of micro-manufacturing techniques comprising the direct printing of anchoring micro-elements by high-resolution 3D printing, subsequent micro-moulding to obtain a micro-mould with negative imprint of the anchoring micro-elements and finally casting of the soluble material into the obtained micro-mould.

According to the invention, the arrays of anchoring micro-elements 12 are designed with CAD technologies, step 101, and the relative parametric geometry sent to a high-resolution 3D printer which realises the arrays of anchoring micro-elements 12 on a rigid support, step 102. Advantageously, the aforementioned 3D printing step is performed with two-photon polymerisation (2PP) technology on a silicon support. Subsequently, the 3D printed matrix is used to obtain a PDMS micro-mould, step 103. More specifically, the moulded anchoring micro-elements 12 are silanised, coated with poly(dimethylsiloxane) (PDMS), and allowed under vacuum. At this point, the PDMS micro-mould can be directly used to perform a casting of soluble material, step 104, in order to directly obtain a device 10 according to the invention, which once solidified is removed from the micro-mould, step 105. In the aforementioned step, the soluble material is advantageously isomalt which is heated to about 100° C. and to which the substances containing the active ingredients to be transferred to the plant are mixed. The liquid phase mixture is cast into the PDMS micro-mould and pressure and heat are applied to ensure proper filling of the cavities of the micro-mould.

Alternatively, in order to allow a large-scale manufacture of the device 10, after the aforementioned step 103 in which the PDMS micro-mould is obtained, a step of casting a thermoplastic material in the PDMS micro-mould, step 106, is repeated for a number of times so that a plurality of auxiliary devices is realised, 111 which instead of being made of soluble material are made of thermoplastic material, which is advantageously PCL. The auxiliary devices 111 are arranged in a suitable housing, 112, step 107. The housing 112 containing the auxiliary devices 111 is used as a matrix to obtain a PDMS multi-mould, 113, step 108, in which the casting of soluble material, step 109 is then performed, so that in a single casting operation a plurality of miniaturised soluble devices 10 according to the invention is made.

The method described above allows a very simple and economical large-scale production of the devices 10. In addition, the disclosed production method makes it possible to easily mix the active ingredients to the soluble material of which the anchoring micro-elements 12 are made.

The embodiments described above are by way of a non-limiting example only, and based on what is described above, the person skilled in the art will certainly be able to implement the invention and implement further variants and modifications of a technical constructive nature, without departing from the scope of protection offered by the following claims.

The project leading to this application has received funding from the European Union's Horizon 2020 research and innovation programme under the grant agreement No 824074

The invention claimed is:

1. A miniaturized integrated device operable for deploying substances into an inner tissue of a leaf of a plant, comprising:
   a sheet support;
   a matrix of abaxial hook-shaped anchoring microelements protruding from the sheet support, each abaxial hook-shaped microelement comprising a conical base and a hooked upper portion that becomes thinner towards an apical part and having a horizontal extension along the sheet support greater than its extension orthogonal thereto;
   the anchoring microelements being made of a soluble material based on sugar alcohols selected from the group consisting of isomalt, erythritol, lactitol, maltitol, mannitol, xylitol, sorbitol and combinations thereof, the material being mixed with substances containing active ingredients; and
   electronic components comprising sensors for monitoring an effect of the substances deployed on the plant.

2. The miniaturized integrated device according to claim 1, wherein the soluble material based on sugar alcohols comprises one or more sugar alcohols selected from the group consisting of erythritol, lactitol, maltitol and combinations thereof.

3. The miniaturized device according to claim 1, wherein the soluble material based on sugar alcohols selected from the group consisting of mannitol, xylitol, sorbitol and combinations thereof.

4. The miniaturized device according to claim 1, wherein the soluble material based on sugar alcohols comprises isomalt.

5. The miniaturized device according to claim 1, wherein the active ingredients are selected from the group consisting of molecules, nanoparticles, nucleic acids, viruses, bacteria, ions, salts and combinations thereof.

6. The miniaturized device according to claim 1, wherein the anchoring microelements are at least partially coated with a layer of a material with reduced solubility that is a material not soluble in a sap of the plants or has a solubility in the sap of the plants lower than that of the sugar alcohols forming the anchoring microelements.

7. The miniaturized device according to claim 1, wherein the matrix of abaxial hook-shaped anchoring microelements comprises microelements having dimensions of an order of tens or hundreds of μm, and arranged in arrays on a sheet support, each abaxial hook-shaped anchoring microelement comprising:

a conical base having a base diameter Db; and a hooked upper portion having a diameter Dm and a height Harc;

such that diameter Db is between two and three times diameter Dm.

8. The miniaturized device according to claim 7, wherein each abaxial hook-shaped anchoring microelement has a total height Htot approximately equal to twice the height Harc of its hooked upper portion, and wherein a horizontal length-Larc of the hooked upper portion measured from its inner side is between 1.5 and 2 times Harc and between 1 and 2 times diameter Dm.

9. The miniaturized device according to claim 1, further comprising a distal portion and a proximal portion, wherein the proximal portion consists of a pair of jaws through which the leaf is operable to be clamped, wherein inner sides of the pair of jaws are provided with the anchoring micro-elements.

10. The miniaturized device according to claim 9, wherein the proximal portion includes the sensors, wherein the sensors are selected from the group consisting of humidity sensors, temperature sensors, light sensors and combinations thereof, and the distal portion includes electrical and electronic components that allow the acquisition, processing and remote sending of data acquired by the sensors.

* * * * *